(12) United States Patent
Wicker

(10) Patent No.: US 7,906,198 B2
(45) Date of Patent: Mar. 15, 2011

(54) DOCUMENT CONTAINING SECURITY IMAGES

(76) Inventor: Thomas M. Wicker, Hemlock, NY (US)

( * ) Notice: Subject to any disclaimer, the term of this patent is extended or adjusted under 35 U.S.C. 154(b) by 1032 days.

(21) Appl. No.: 10/555,936

(22) PCT Filed: May 10, 2004

(86) PCT No.: PCT/US2004/014517
§ 371 (c)(1),
(2), (4) Date: Dec. 15, 2006

(87) PCT Pub. No.: WO2004/110773
PCT Pub. Date: Dec. 23, 2004

(65) Prior Publication Data
US 2007/0164558 A1 Jul. 19, 2007

Related U.S. Application Data

(60) Provisional application No. 60/473,951, filed on May 29, 2003.

(51) Int. Cl.
*B41M 5/00* (2006.01)
*B44C 1/17* (2006.01)
*G03G 7/00* (2006.01)

(52) U.S. Cl. ............ 428/195.1; 428/29; 283/72; 430/10

(58) Field of Classification Search ............ 428/29, 428/30, 195.1, 916; 430/10; 283/72, 74, 283/83, 93, 94, 114, 902
See application file for complete search history.

(56) References Cited

U.S. PATENT DOCUMENTS

| 2,065,605 A | 12/1936 | Moore |
| 2,952,080 A | 9/1960 | Avakian et al. |
| 3,109,239 A | 11/1963 | Wicker et al. |
| 3,675,948 A | 7/1972 | Wicker |

(Continued)

FOREIGN PATENT DOCUMENTS

DE 3602563 C1 4/1987

(Continued)

OTHER PUBLICATIONS

Phillips, "Combining nanocharacter printing, digital watermarking and UB coded taggents for optimal machine readable security" Optical Security and Counterfeit Deterrence Techniques, vol. 4677, Jan. 24, 2002 pp. 150-158, XP002296367.

(Continued)

*Primary Examiner* — Mark Ruthkosky
*Assistant Examiner* — David J Joy
(74) *Attorney, Agent, or Firm* — Stephen B. Salai, Esq.; Thomas B. Ryan, Patent Agent; Harter Secrest & Emery LLP

(57) ABSTRACT

A document containing security images which enable original documents to be distinguished from copies of the originals. The document 60 bears an image 63 containing a latent image 68. Latent image 68 may be formed from two or more images 65 and 66. The first image 65 is preferably formed at a high line frequency and at a first angle in one or more colors. The second image 66 is preferably formed at a lower line frequency at the same angle as first image 65 and in one or more colors. The colors in the first image 65 and the second image 66 are preferably chosen so that latent image 68 has substantially the same color as image 63.

14 Claims, 11 Drawing Sheets

U.S. PATENT DOCUMENTS

| | | | |
|---|---|---|---|
| 3,862,501 A | | 1/1975 | Jemseby et al. |
| 4,033,059 A | | 7/1977 | Hutton et al. |
| 4,066,280 A | | 1/1978 | LaCapria |
| 4,168,088 A | | 9/1979 | Somlyody |
| 4,310,180 A | | 1/1982 | Mowry, Jr. et al. |
| 4,506,914 A | | 3/1985 | Gobeli |
| 4,525,858 A | | 6/1985 | Cline et al. |
| 4,579,370 A | | 4/1986 | Corwin et al. |
| 4,582,346 A | | 4/1986 | Caprio et al. |
| 4,588,212 A | | 5/1986 | Castagnoli |
| 4,632,430 A | | 12/1986 | Wicker |
| 4,668,597 A | | 5/1987 | Merchant |
| 4,684,593 A | | 8/1987 | Wicker |
| 4,780,397 A | | 10/1988 | Tsuchiya |
| 5,074,596 A | * | 12/1991 | Castagnoli ............... 283/91 |
| 5,149,140 A | | 9/1992 | Mowry, Jr. et al. |
| 5,374,976 A | | 12/1994 | Spannenburg |
| 5,447,335 A | | 9/1995 | Haslop |
| 5,468,581 A | | 11/1995 | Coe et al. |
| 5,487,567 A | | 1/1996 | Volpe |
| 5,535,007 A | | 7/1996 | Kim |
| 5,694,229 A | * | 12/1997 | Drinkwater et al. ............ 359/2 |
| 5,722,693 A | * | 3/1998 | Wicker ..................... 283/67 |
| 5,788,285 A | | 8/1998 | Wicker |
| 6,045,881 A | | 4/2000 | Gasper et al. |
| 6,050,606 A | | 4/2000 | Foresti |
| 6,199,911 B1 | | 3/2001 | Isherwood et al. |
| 6,966,998 B1 | | 11/2005 | Spowart |

FOREIGN PATENT DOCUMENTS

| | | |
|---|---|---|
| EP | 0204552 A2 | 12/1986 |
| EP | 0490457 B1 | 12/1991 |
| EP | 0328173 B1 | 3/1992 |
| EP | 0 789 270 | 8/1997 |
| FR | 2110730 | 2/1972 |
| FR | 2 622 840 | 5/1989 |
| GB | 1138011 | 12/1968 |
| GB | 2217258 A | 10/1989 |
| WO | 9008046 A1 | 7/1990 |
| WO | 9322145 A1 | 11/1993 |

OTHER PUBLICATIONS

Canadian Office Action dated Mar. 21, 2007.

Van Renesse, Rudolf L. ed., 1994 Artech House, Inc. publication; Title: "Optical Document Security", Chapters 7 and 15, 1994—Library of Congress Catalog Card No. HV6675.V25 1993.

* cited by examiner

DOCUMENT CONTAINING SECURITY IMAGES

This application is the U.S. National Phase under 35 U.S.C. §371 of International Application No. PCT/JP2004/014517, filed May 10, 2004, which in turn claims the benefit of U.S. application Ser. No. 60/473,951, filed May 29, 2003, the disclosures of which Applications are incorporated by reference herein in their entirety.

This application is a continuation in part of PCT Application US2004/001360 which claims the benefit of U.S. Provisional Application No. 60/443,288 filed Jan. 29, 2003, U.S. Provisional Application No. 60/443,289 filed Jan. 29, 2003, and U.S. Provisional Application (unknown) filed January (unknown), and also is a continuation in part of PCT Application US03/32159 filed on Oct. 9, 2003 which claims the benefit of each of the following U.S. provisional applications filed Oct. 10, 2002; 60/417,750; 60/417,751; 60/417,752; 60/417,753; 60/417,754; 60/417,755; 60/417,756; 60/417,757; 60/417,758. This application claims the benefit of U.S. Provisional Application No. 60/473,951 filed May 29, 2003 titled PRISMATIC HOLOGRAPH. Each of the above applications are herein incorporated by reference in their entirety.

FIELD OF THE INVENTION

This invention relates generally to document protection methods and products, and more particularly to methods and products for printing and obtaining original documents that can be readily differentiated from copies made of those documents. The document protection methods and products also allow detection of an original document by a document reader.

BACKGROUND OF THE INVENTION

Many methods and products have been developed, for example, to deter counterfeiting of valuable documents including art work, identification documents or financial instruments such as currency, so that unauthorized copies attempted to be made from those documents can be readily distinguished from the originals. Most of these methods and products involve preparing an original document by printing or lithography on high quality media such as silk, rice paper, and high contact rag paper. The printing of original documents may be done either in black-and-white (B&W) or in color, and if in color, either in spot color, colored backgrounds and/or multicolor printing. In the case of color, the tendency has been in the direction of using multiple colors for original documents for aesthetic value, for ease of recognition, and originally for protection from copying by conventional means. The common printing processes of valuable originals, whether in B&W or in color, are intaglio and gravure, among others. These and the other processes mentioned in this application are very well known in the art and will not be discussed in great detail.

Most of the useful examples in the prior art to deter counterfeiting and the like are intended to ensure that copies are produced either with a clear moiré pattern or with a "latent image" indicia which is invisible or nearly invisible to the naked eye on the original document. The term "latent image" is used here not in the photographic sense of an unseen image to be developed after processing by chemical reaction, but to indicate indicia that are printed on originals so as to be nearly invisible to the naked eye.

These and other developments in the prior art for purposes of providing document protection are disclosed in the patent literature, as for example, in U.S. Pat. No. 5,018,767 issued May 28, 1991; U.S. Pat. No. 5,193,853 issued Mar. 16, 1993; and U.S. Pat. No. 3,675,948 issued Jul. 11, 1972; and U.S. Pat. No. 4,143,967 issued Mar. 13, 1979, all to Ralph C. Wicker; in U.S. Pat. No. 4,227,720 issued Oct. 14, 1980 and U.S. Pat. No. 4,310,180 issued Jan. 12, 1982 both to William H. Mowry, et al, as well as U.S. Pat. No. 5,149,140 issued Sep. 22, 1992 to Mowry et al; and in U.S. Pat. No. 5,487,567 issued Jan. 30, 1996 to John R. Volpe. All of these patents disclose various means for providing methods and products to enable copies of documents to be distinguished from the originals, as for example, by a "large dot-small dot pattern", a "close line-spaced pattern", and images or indicia which are screen printed at minutely varied spaces and/or angles on the originals and are intended to produce a highly visible moiré pattern effect on the unauthorized copies. In this specification, the words "print", "printed" and "printing" are used to refer to the making of an original document regardless of the techniques used, and the words "copy" and "copying" to refer to making copies from an original.

It is well known, however, that copier and computer scanner-printer technology has become even more sophisticated since the development of the prior art in document protection. The goal of copier technology, if not already achieved, has been, especially in desktop publishing and the like, to obtain copies as good as an original. "What you see is what you get" in color documents has become very achievable in copier and duplicator equipment including scanning input devices. Even desk-top computers have become sufficiently sophisticated in color reproduction, including color matching of copies to color standards such as the PANTONE.RTM. Color Matching System.

Many if not all of the document protection methods and products were developed before this very significant improvement in copier and computer reproduction technology, and have been found not be as effective in the newer color reproduction technology. This is especially the case on color copiers with a "photo" setting that intentionally copies a document in an "unsharp" focus so as to give the effect of a continuous tone image, the effect of which is to defeat the precise line variation between the copier scanner and the security pattern on the document original. These prior art techniques for document protection may not work as reliably against the many forms of copier/duplicator and computer scanner/output equipment now or soon to be available.

Thus it has become imperative for purposes of document security and safety that further improvements in the area of document protection be found, especially where there is a need to prevent copying or duplicating of valuable originals and readily distinguishing the copies from the originals.

SUMMARY OF THE INVENTION

It is an object of the invention to overcome the above problems and provide enhanced security for documents.

A document carrying an image may comprise a background portion printed at a first line frequency and at a first color; a first image portion printed at a second line frequency and a second color; and a second image portion printed at the second line frequency and a third color, wherein a combined image the first image portion and the second image portion appear to be substantially the same color as the first color. In the document, the first image portion may include printed lines, dots or spots, and the second image portion may include printed lines dots or spots placed between adjacent printed lines dot or spots of the first image portion. In the document, the first image portion may be printed at a density between 5 percent and 95 percent of the combined image of the first and second image portions. When the document is reproduced by a copying or scanning device, a solid tonal color may be reproduced in the area of the first image portion and the second image portion in substantially the same color at the first color, thereby not reproducing the first image portion and the second image portion.

A document carrying an image may comprise: a background portion having printed lines dots or spots at a first angle and at a first color; an image portion having printed lines dots or spots at substantially the same color as the first color and at a different angle than the first angle, wherein when the document is reproduced by a copying or scanning device, a solid tonal color may be reproduced in the area of the image portion in substantially the same color at the first color, thereby not reproducing the first image portion. In the document, at least one of the background portion and the image portion may be printed at a line frequency greater than about 175 lines per inch.

A document carrying an image may comprise: a background portion having printed lines dots or spots at a first angle and at a first line frequency; an image portion have printed lines dots or spots at a second angle and at a second line frequency, wherein the first line frequency is at least two times greater than the second line frequency. In the document, the first line frequency may be greater than about 175 lines per inch. In the document, an image formed by the image portion may be substantially hidden, and when the document is reproduced by a copying or scanning device, the image formed by the image portion is not substantially hidden in the reproduced document.

A document carrying a latent image may comprise: a first image portion formed at a first color; a first latent image portion printed at a first line frequency at a first angle and a second color; and a second latent image portion printed at the second line frequency lower than the first line frequency at substantially the first angle and a third color, wherein a combined image the first latent image portion and the second latent image portion may form substantially the same color as the first color. In the document the first latent image portion may include printed lines, dots or spots, and the second latent image portion may include printed lines dots or spots placed between adjacent printed lines dot or spots of the first image portion. When the document is reproduced by a copying or scanning device, a composite image of the first latent image portion and the second latent image portion may be formed as a visible image in a copy of the document. In the document, the first image portion may be a holographic image. In the document, the first image portion may be art work, and the first latent image portion and the second latent image portions may be formed after the creation of the art work or at the same time as the art work. In the document, the first image portion may be a photograph, and the first latent image portion and the second latent image portions may be formed after the creation of the photograph or at the same time as the photograph. A copy of the document may contain distortions.

An apparatus for authenticating a document as an original document may comprise: a magnification unit capable of magnifying images contained on the document; a scanning unit capable of scanning images magnified by the magnification unit and creating an electronic format of the images contained on the document; a microprocessor which receives the electronic format and determines if the document contains predetermined security images which are not reproduced when the a reproduction of the document is made by a copying or scanning device. In the apparatus, the microprocessor may compare a layout of the document to a layout of the original document, and the microprocessor may determine the document to be an original document if the layout of the document corresponds to the layout of an original document. The apparatus may further comprise a display which displays a message indicative of whether the document has been determined to be an original document.

A method of authenticating a document as an original document may comprise the steps of: reviewing the document for the presence of predetermined security images which are not reproduced when a reproduction of the document is made by a copying or scanning device; and determining the document not to be an original if the predetermined security images are not present in the document. The method may further comprise the steps of comparing a layout of the document to a layout of the original document, and determining the document to be an original document if the layout of the document corresponds to the layout of an original document. The method may further comprise the step of displaying a message indicative of whether the document has been determined to be an original document.

A computer readable medium may carry instructions to cause a computer to perform a method of authenticating a document as an original document comprising the steps of: reviewing the document for the presence of predetermined security images which are not reproduced when a reproduction of the document is made by a copying or scanning device; and determining the document not to be an original if the predetermined security images are not present in the document. In the computer readable medium, the method may further comprise the steps of comparing a layout of the document to a layout of the original document, and determining the document to be an original document if the layout of the document corresponds to the layout of an original document. In the computer readable medium, the method may further comprise the step of displaying a message indicative of whether the document has been determined to be an original document.

BRIEF DESCRIPTION OF THE DRAWINGS

The accompanying drawings, which are incorporated in and form a part of the specification, together with the description serve to explain the principles of the invention. In the drawings.

DETAILED DESCRIPTION OF THE INVENTION

Figure 1:
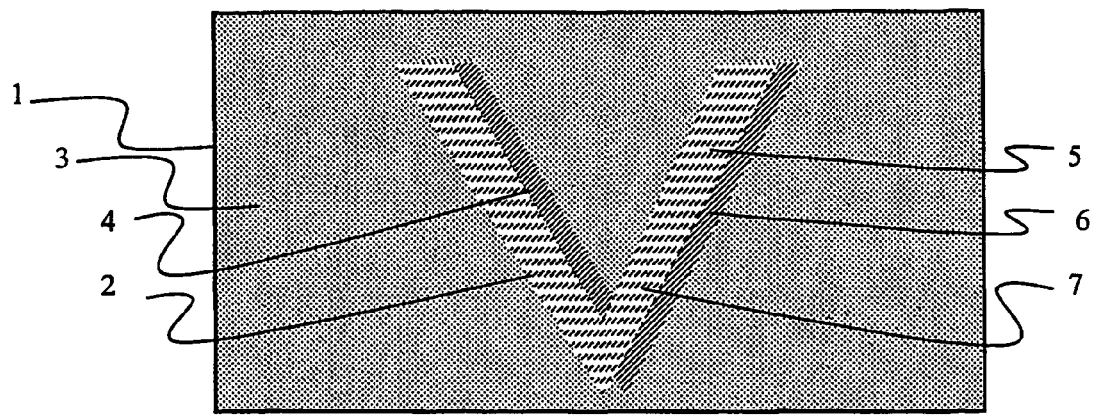
FIG. 1 illustrates a document having a latent security image.

FIG. 1 illustrates a document 1 having a latent security image 2 which is generally hidden to the human eye. In FIG. 1, a background area 3 is preferably printed at a high line frequency. An image 2 is printed with a first color 4 at a predetermined density and printed with a second color 5 also at a predetermined density. The result is that image 2 appears as a third color to the human eye. Preferably, background area 3 is printed in the third color or a color similar to the third color, causing image 2 to be obscure to the eye.

The image 2 may be formed by printing the first color 4, such as by printing lines 6 having a first color at predetermined pitch and thickness. Then the second color 5 may be printed such as by printing lines 7 having a second color between lines 5 at a predetermined pitch and thickness, such as by using a negative image of image 2. Those of skill in the art will appreciate that lines 6 and 7 may be printed in a single print operation as well, such as by using a laser printer or the like. Also, although only two colors are discussed for purposes of illustration, those of skill in the art will appreciate that more than two colors may be used, including six or more colors.

Preferably, the density of lines 6 and 7 are controlled by controlling the pitch (distance between lines), thickness of the lines 6 and 7, or by controlling the density of the medium, such as ink, used to print lines 6 and 7. The density of lines 6 and 7 may range from 5% to 95% depending on the colors selected for lines 6 and 7, the density of the medium, the thickness of the lines, and the desired appearance of image 2. In an exemplary embodiment, a density of 50% for each of lines 6 and 7 may be used, with a red color for line 6 and a green color for line 7. Also in an exemplary embodiment, lines 6 and 7 may be printed at a different angle than used to print background 3.

Image 2 may be detected using a reading device which magnifies the image to reveal the two colors, or selectively screens one of the two colors. Latent image 2 preferably may also be detected using an appropriately configured magnification device, such as a document verifying device as described in U.S. Pat. No. 5,735,547, herein incorporated by reference. When document 1 is copied or scanned by conventional copying or scanning devices, such as a color photocopier, image 2 is substantially not reproduced in the copy. Particularly, the copy of document 1, even if in the same color tone as the original document 1, will contain background area 3 across the entire document, and will not contain image 2. The presence or absence of image 2 may be used to determine if a document is an original or a copy, respectively.

Figure 2:
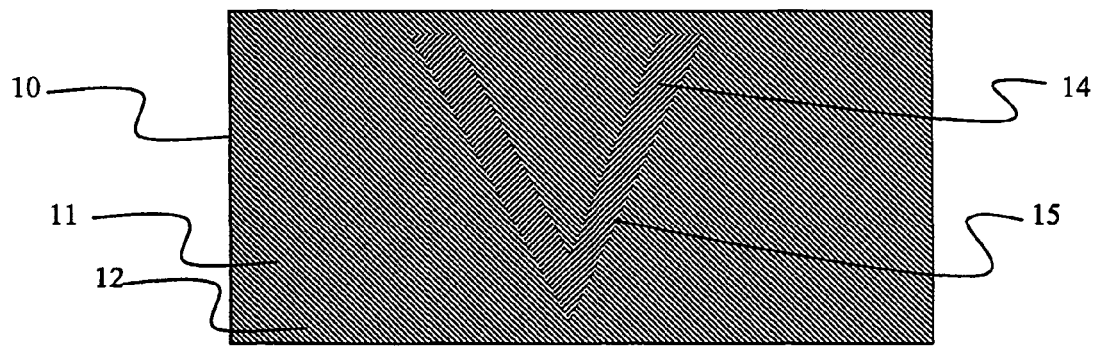
FIG. 2 illustrates another embodiment of a document having a latent security image which is hidden to the human eye.

FIG. 2 illustrates a document 10 having a latent security image 14 which appears hidden to the human eye. As illustrated in FIG. 2, document 10 preferably has a background area 11 which contains lines 12 of a high frequency, such as about 175 lines per inch or more. Lines 12 preferably have a color. Image 14 preferably contains lines at about the same frequency but at a different angle from lines 12. Lines 12 and or 15 may be lines, dots or spots.

In an exemplary implementation of the concepts of FIG. 2, lines 12 may be printed in blue at an angle of 30 degrees with a frequency of 280 lines per inch, and lines 14 may be printed at 45 degrees in blue and also with a frequency of 280 lines per inch.

Image 14 may be detected using a reading device which magnifies the image to reveal lines 15 or selectively screens lines 12 to reveal lines 15. When document 10 is copied or scanned by conventional copying or scanning devices, such as a color photocopier, image 14 is substantially not reproduced in the copy. Particularly, the copy of document 10, even if in the same color tone as the original document 10, will contain background area 11 across the entire document, and will not contain image 14. The presence or absence of image 14 may be used to determine if a document is an original or a copy, respectively.

Figure 3:
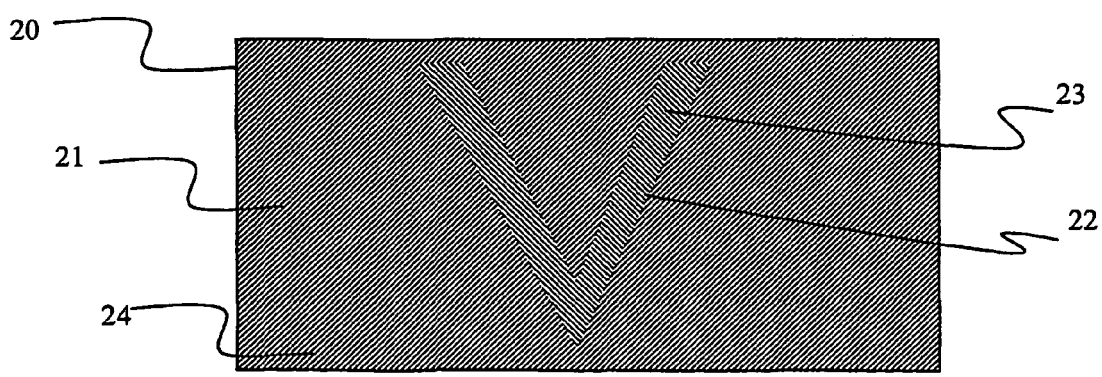
FIG. 3 illustrates another embodiment of a document with a latent image.

FIG. 3 illustrates a document 20 with a latent image 22. Document 20 contains a background area 21 which is preferably printed at a first frequency, such as 175 lines per inch or greater, and at a predetermined angle. Image 22 is preferably printed at lower frequency than the frequency of background area 21. Preferably, the frequency of lines 24 in area 21 is greater than two times the screen frequency of lines 23 in image 22. More preferably, the line frequency in area 21 is at least three times greater than the line frequency of lines 23 in image 22. The angle of the lines 22 is preferably at a different angle than the angle of lines 24 by at least 5 degrees. The width of lines 24 and 23 may be selected to provide a continuous aesthetically pleasing appearance of the document. Both lines 24 and 23 preferably have the same color.

In an exemplary implementation of a security document using the principles illustrated in FIG. 3, lines 24 in background area 21 may have a frequency of at least 175 lines per inch and preferably of 300 lines per inch, and a line width of 0.0025 inches at a 45 degree angle, and lines 23 in image 14 may have a frequency between 100-133 lines per inch and preferably a frequency of 95 lines per inch at a 30 degree angle.

Figure 4:
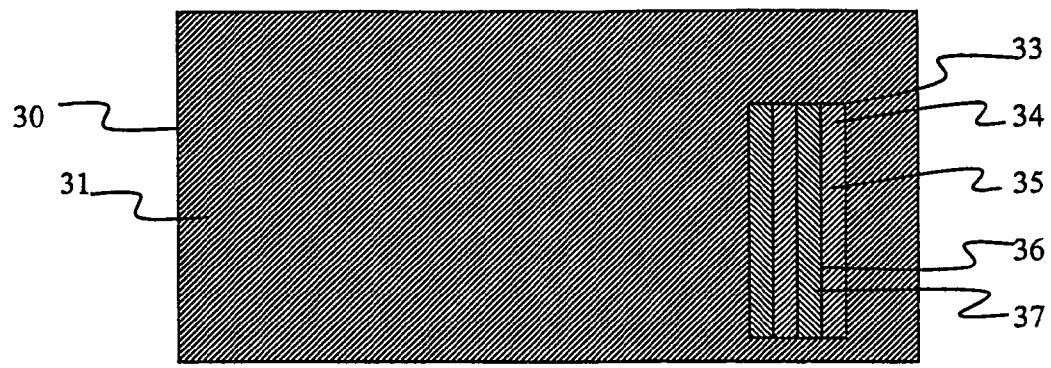
FIG. 4 illustrates a document which contains a dedicated security image.

FIG. 4 illustrates a document 30 which contains a dedicated security image 33 having a plurality of high and low frequency portions. As illustrated in FIG. 4, document 30 preferably has a background area 31. Image 33 preferably contains first segments 34 which contains lines 35 which range from a high frequency to a low frequency and second segments 36 which contain lines 37 which range from a low frequency to a high frequency. Although two segments are shown for each of the first and second segments 34 and 36, respectively, any number of segments may be used, including one segment for either segment 34 and 36. The line frequency in each of segments 34 and 36 may change continuously in a linear or non-linear manner or stepwise from one terminal end of each of segments 34 and 36 to the opposite terminal end, respectively. Each of lines 35 and 37 may be printed in black or in any color.

If image 33 is reproduced by conventional copying or scanning devices, the reproduced image will preferably show significant distortions, such as moiré patterns.

Figure 5:
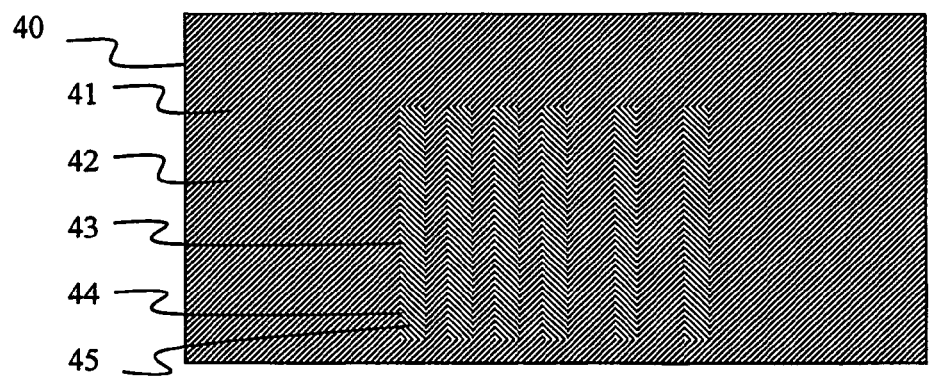
FIG. 5 illustrates a document which contains a latent image in the form of a bar code.

FIG. 5 illustrates a document 40 which contains a latent image 43 in the form of a bar code. As illustrated in FIG. 5, document 40 contains a background area 41 which contains lines 42 at a predetermined frequency and predetermined angle. Image 43 preferably contains a plurality of bars 44 which may form a bar code which may contain information readable by a bar code reader. Bars 44 preferably contain lines 45 at a predetermined frequency, which may be the same frequency as lines 42. Lines 45 may preferably be printed at a different angle than lines 42 as discussed in the construction of FIG. 3, or lines 45 and 42 may be printed in similar colors as discussed in the construction of FIG. 2 and FIG. 1. Any suitable technique for providing a latent bar code image that may not be reproduced may be used. In an exemplary construction in accordance with the concepts of FIG. 5, lines 42 and 45 may each be printed at the same frequency, which is a frequency between 150 to 400 lines per inch.

Image 43 may be detected using a reading device which magnifies the image to reveal lines 45 or selectively screens lines 42 to reveal lines 45. A bar code reader may then detect the bar code and read information from the bar code. The information provided by the bar code may include document identifying information or other security information.

When document 40 is copied or scanned by conventional copying or scanning devices, such as a color photocopier, image 43 is substantially not reproduced in the copy. Particularly, the copy of document 40, even if in the same color tone as the original document 40, will contain background area 41 across the entire document, and will not contain image 43. The presence or absence of image 43 may be used to determine if a document is an original or a copy, respectively.

Figure 6:
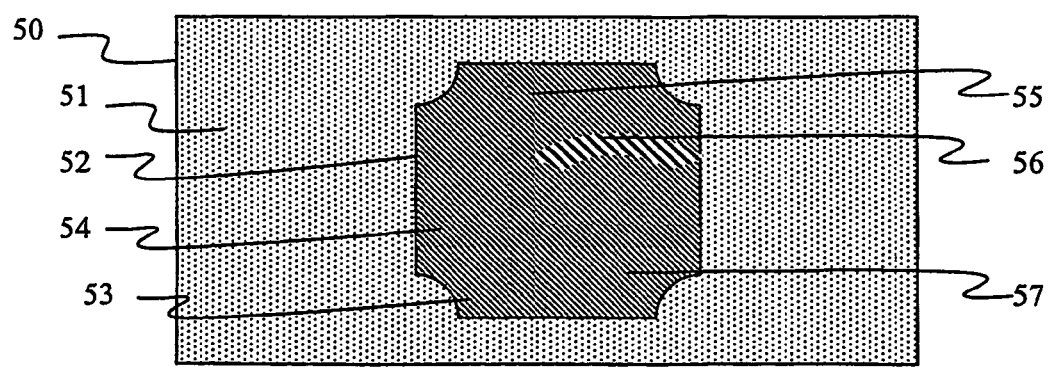
FIG. 6 illustrates a document which contains an image which contains distortion or moiré inducing patterns.

FIG. 6 illustrates a document 50 which contains an image 52 which contains distortion or moiré inducing patterns. As illustrated in FIG. 6, document 50 contains a background portion 51. Image 52 preferably contains a background portion 53 containing lines 57 at a predetermined frequency and multiple portions 54, 55 and 56 which have various line frequencies which may be higher than or lower than the predetermined frequency of lines 57. For example, the line frequencies in portions 54, 55 and 56 may be printed in one or more high frequencies, such as greater than about 175 lines per inch while, background portion 53 may be printed at a low frequency, such as about 100-135 lines per inch. Alternatively, the multi-frequency portions may range from a high frequency in an area to a low frequency in an area next to a high frequency area.

Figure 7A:
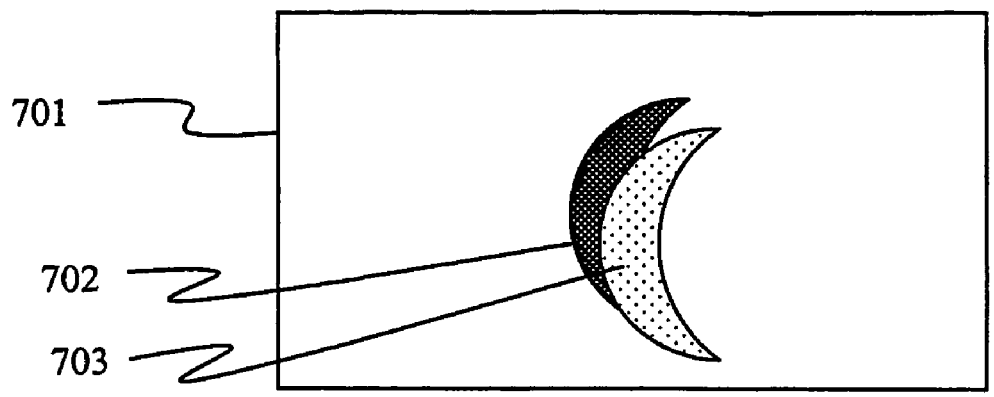
FIGS. 7A and 7B illustrate an exemplary safety medium which prohibits reproduction of the information contained on the medium.
Figure 7B:
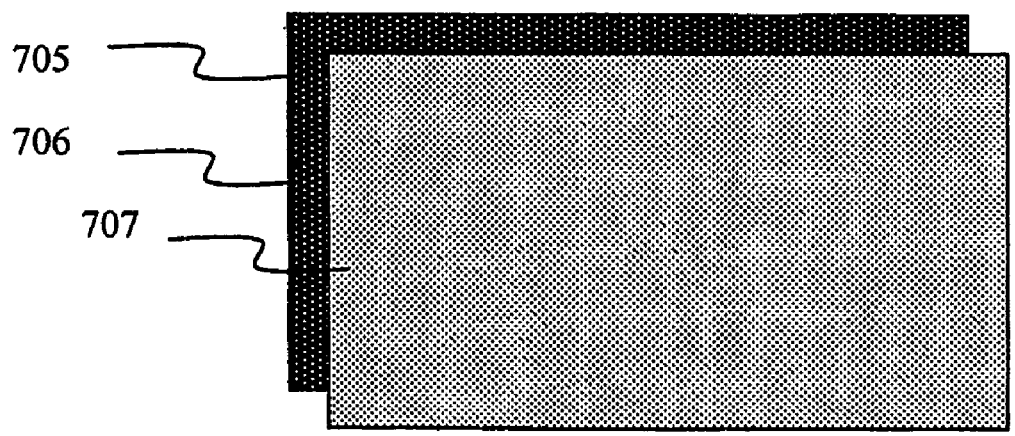

FIGS. 7A and 7B illustrate an image printed on a medium that substantially stops reproduction of information contained on the medium. As illustrated in FIG. 7A, medium 701, such as paper, contains printed images 702 and 703 that preferably interfere with scanners, facsimile machines and laser copiers. A first set of printed images, represented by printed image 702 may be printed in a dark color such as black in negative form. Then a second set of printed images, represented by printed image 703 preferably is a contact positive of the first printed image 702 and may be printed in reflective ink, such as silver ink. Alternatively, as illustrated in FIG. 7B, one of the colors may be printed over all of medium 705 as a solid image 706. Then the second color in a negative form or a positive form image, depending on the form of the first image, respectively, may be printed on top of image 706. In both FIGS. 7A and 7B, reproduction of medium 702 and 705, respectively, will result in a black copy, making the information on medium 702 and 705, respectively, unreadable.

Figure 8:
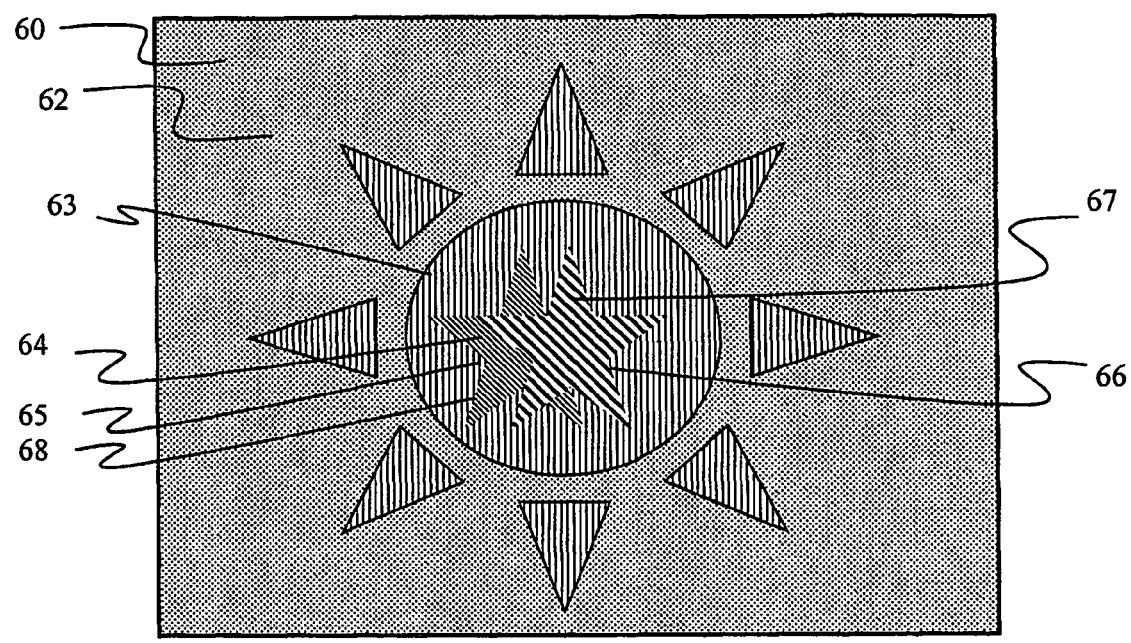
FIG. 8 illustrates a document having a latent security image.

FIG. 8 illustrates a document 60 which bears an image 63 containing a latent image 68. Image 63 may be formed of one more colors and latent image 68 may be formed on document 63, each may be formed by being be printed, embossed, dembossed, foil hot stamped, perfing, holographic processes or any other way to transfer an image to a media. Document 60 may be a newly formed document or may be an existing art work or photograph. Accordingly, latent image 68 may be added to existing art work and photographs.

Latent image 68 may be formed from two or more images 65 and 66, each of which may be formed of lines, dots, swirls, spots, real art work or type. The first image 65 is preferably formed at a high line frequency, such as greater than about 175 lines per inch, and at a first angle in one or more colors. The second image 66 is preferably formed at a low line frequency, such as about 50-135 lines per inch, at the same angle as first image 65 and in one or more colors. The second image 66 is preferably formed between the lines, dot, swirls, or spots of the first image 65 and may be printed either in register or out of register. The colors in the first image 65 and the second image 66 are preferably chosen so that latent image 68 has substantially the same color as image 63. If the document 60 is reproduced, the reproduced copy is preferably very distorted, such as containing moiré patterns, and the composite image of the first image 65 and the second image 66 preferably appears in the reproduced copy. Accordingly, the latent image 68 protects an original document from copying, for example, by using the visible presence or absence of latent image 68, an original document can be readily discriminated from a copy.

As described in connection with FIGS. 10-11, the latent image 68 may be detected in an original document by an appropriately configured reading device. Latent image 68 preferably may also be detected using an appropriately configured magnification device, such as a document verifying device as described in U.S. Pat. No. 5,735,547.

Figure 9A:
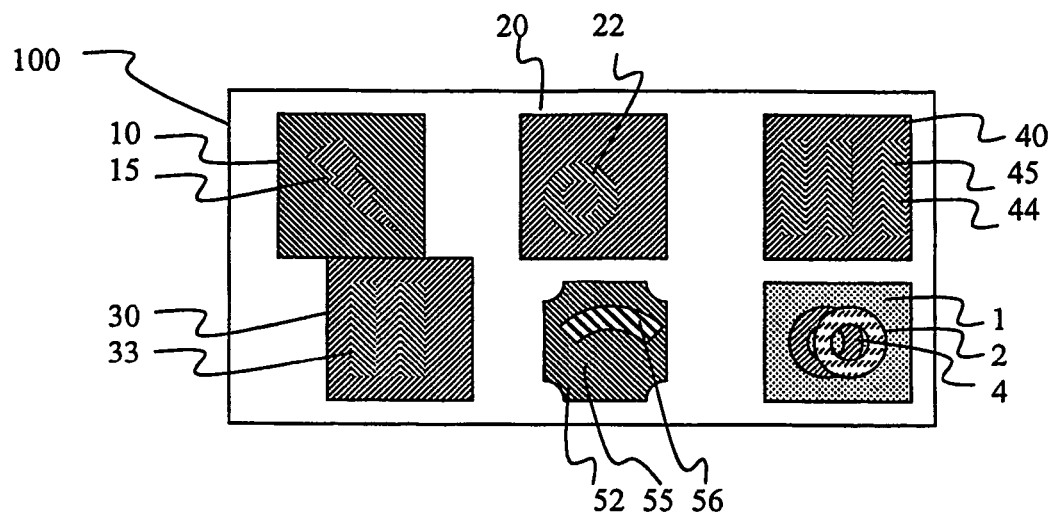
FIGS. 9A and 9B illustrate documents containing a plurality of security images.
Figure 9B:
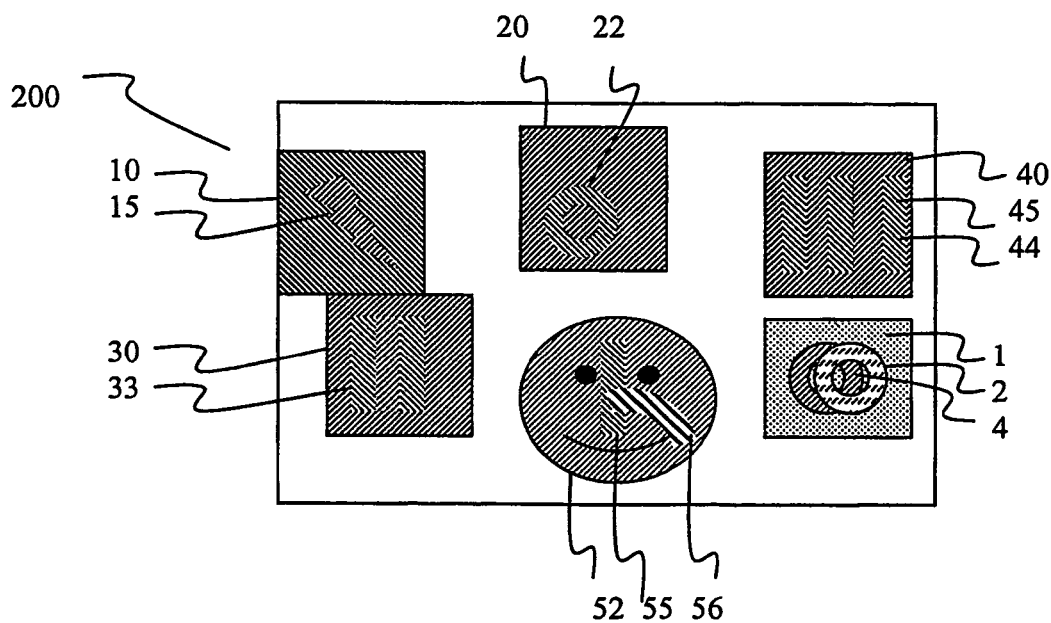

Those of skill in the art will appreciate that any number of the security images described in FIGS. 1-8 may be presented separately or in combination on a single document. FIG. 9A illustrates a document 100 containing a plurality of security images 1, 10, 20, 30, 40, and 52, which are discussed in connection with FIGS. 1-7B. FIG. 9B illustrates an identification card 200 containing a plurality of security images 1, 10, 20, 30, 40, and 52, which are discussed in connection with FIGS. 1-7B. Although not illustrated, document 60 may also be included on document 100 and/or identification card 200.

Art work may be protected by applying a security image to a part of the work to enable an original work to be distinguished from a copy.

Figure 10:
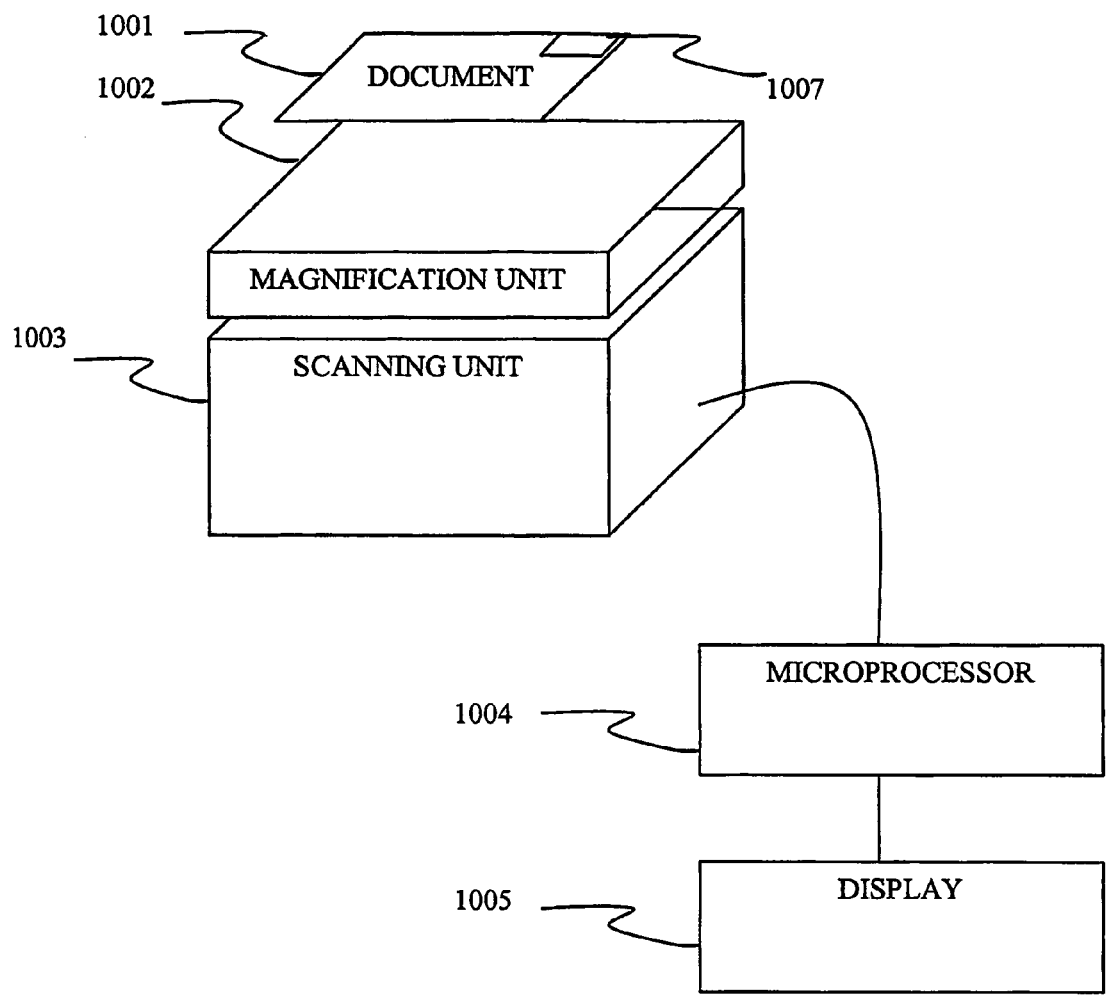
FIG. 10 illustrates an exemplary reading device for detecting security images in a document.

FIG. 10 illustrate an exemplary construction of a reading device which may be used to detect security images in document 100 or card 200. As illustrated in FIG. 10, document 1001 containing security image 1007 may be magnified by magnifying unit 1002 which provides a magnified image to scanning unit 1003. Security image 1007 may formed in accordance with one or more of the techniques illustrated in FIGS. 1-8. Magnifying unit 1002 may be any conventional magnification device as known to those of skill in the art and may be integrally formed with scanning unit 1003 or may be independent of scanning unit 1003. Magnification unit 1002 may enable an optical and/or a digitally enhanced magnification as known to those of skill in the art. A preferred magnification device is capable of providing a magnification of less than 100% of the document image up to 1000% of the document image.

The scanning unit 1003 may be any conventional type of scanning unit, including scanning units capable of providing a digital image of a photograph or of providing an electronic word processor document from a text scan. Scanning unit 1003 may be of the type suitable for use with photographic and text scanners, photocopiers, facsimiles. Scanning unit 1003 preferably generates a scanned representation of a scan of document 1001 and security image 1007, such as a digital representation, and provides this information to a microprocessor 1004. Scanning unit 1003 may contain one or more storage devices (not shown), such as a RAM, floppy disk drive, writeable CD drive, or the like, which may be used to store the scanned representation prior to being sent to the microprocessor.

Microprocessor 1004 processes the scanned representation of document 1001 and particularly of security image 1007. Preferably, microprocessor contains verification software that compares the scanned representation of the document against a representation of the original document previously stored in a memory associated with microprocessor 1004. Alternatively, microprocessor 1004 may retrieve the representation of the original document from a remote location, such as through a website or a secure communication link. Microprocessor 1005 may provide results of the comparison to a display 1005.

Microprocessor 1004 may also instruct an access device to provide access to a user when a valid document or ID card is detected. Those of skill in the art will appreciate that an access device may include access to a room or building through a security door and access to information contained on a data base through a secure access port or a firewall, or may simply include access to complete a financial transaction. Preferably, access is denied when microprocessor 1004 determines that scanned document 1004 is not an original document.

Figure 11:
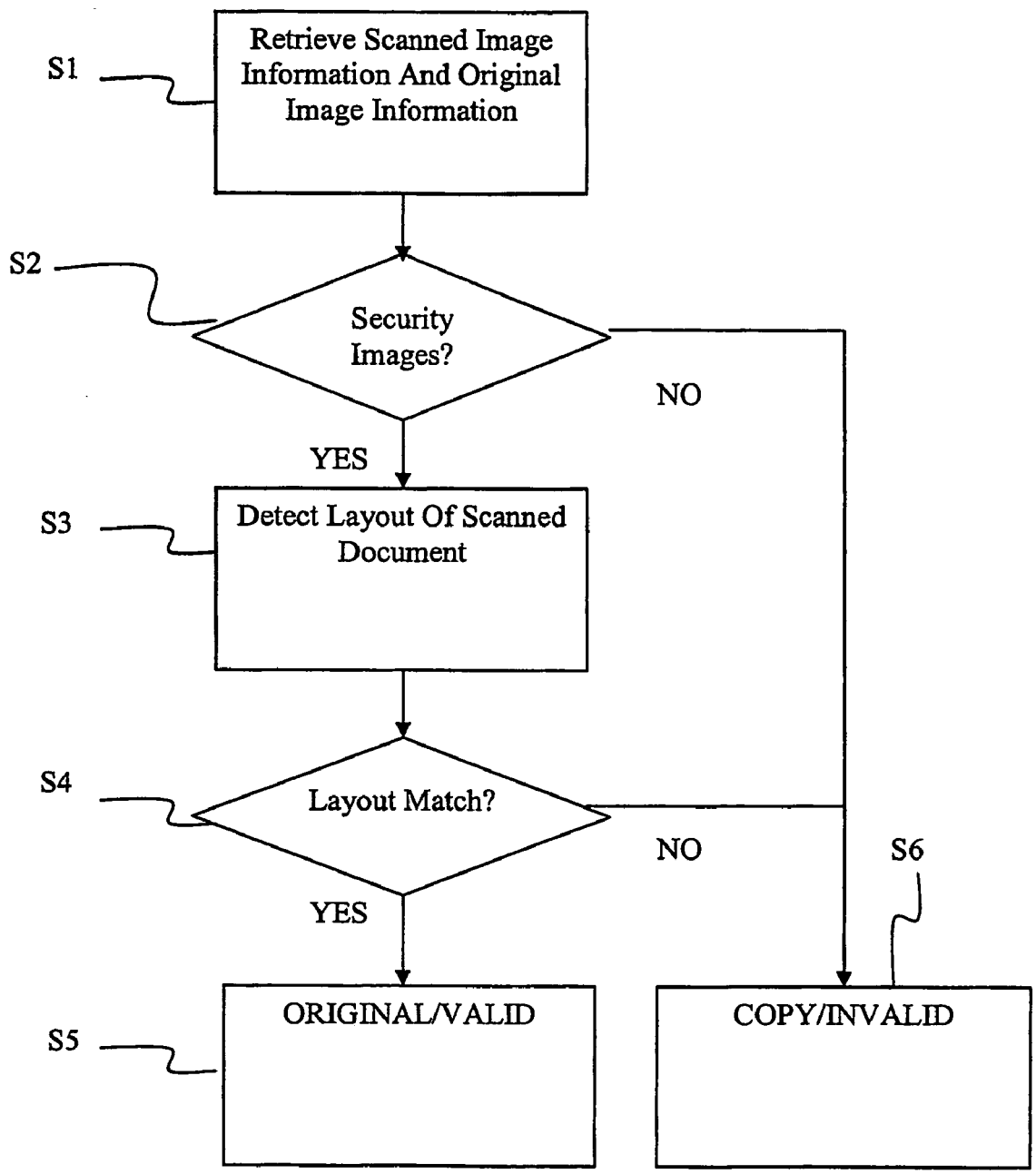
FIG. 11 illustrates an exemplary method of authenticating a document to be an original using the exemplary reading device of FIG. 10.

FIG. 11 illustrates an exemplary method of detecting valid original documents using the reading device depicted in FIG. 10. As illustrated in FIG. 11, the scanned representation of document 1001 and a representation of a corresponding original document are retrieved by the microprocessor in step S1. As illustrated in step S2, the microprocessor 1004 reviews the scanned representation of document 1001 to determine if predetermined security images are present in the scanned document, the predetermined security images are preferably images which are latent security images which are not expected to be reproduced in a copy of the document, such as images constructed in accordance with the principles of FIG. 3. If the predetermined security images are not present in document 1001, NO in step S2, then microprocessor 1004 determines that scanned document 1001 is not an original document, and may instruct display 1005 to display "COPY", or "INVALID" or the like instructions.

If the predetermined security images are present in document 1001, microprocessor 1004 may indicate that the document is an original document, or as an increased security measure, microprocessor 1004 may analyze the layout of the scanned document 1001, as illustrated in step S3. The analysis of the layout may include analysis of the location of printed images, both visible images and latent images, analysis of the color, including black and white areas, and/or analysis of the frequency, pitch and/or angles of lines of an image. The layout of scanned document 1001 is compared to the expected layout of an original document, as illustrated in step S4. If the layout of scanned document 1001 does not match the expected layout of an original, NO in step S4, then the microprocessor 1004 determines that scanned document 1001 is not an original document, and may instruct display 1005 to display "COPY" or "INVALID" or the like instructions. If the layout does match the expected layout, YES in step S4, microprocessor 1004 determines that scanned document 1001 is an original or valid document and may instruct display 1005 to display "ORIGINAL" or "VALID", or the like instructions.

Figure 12:
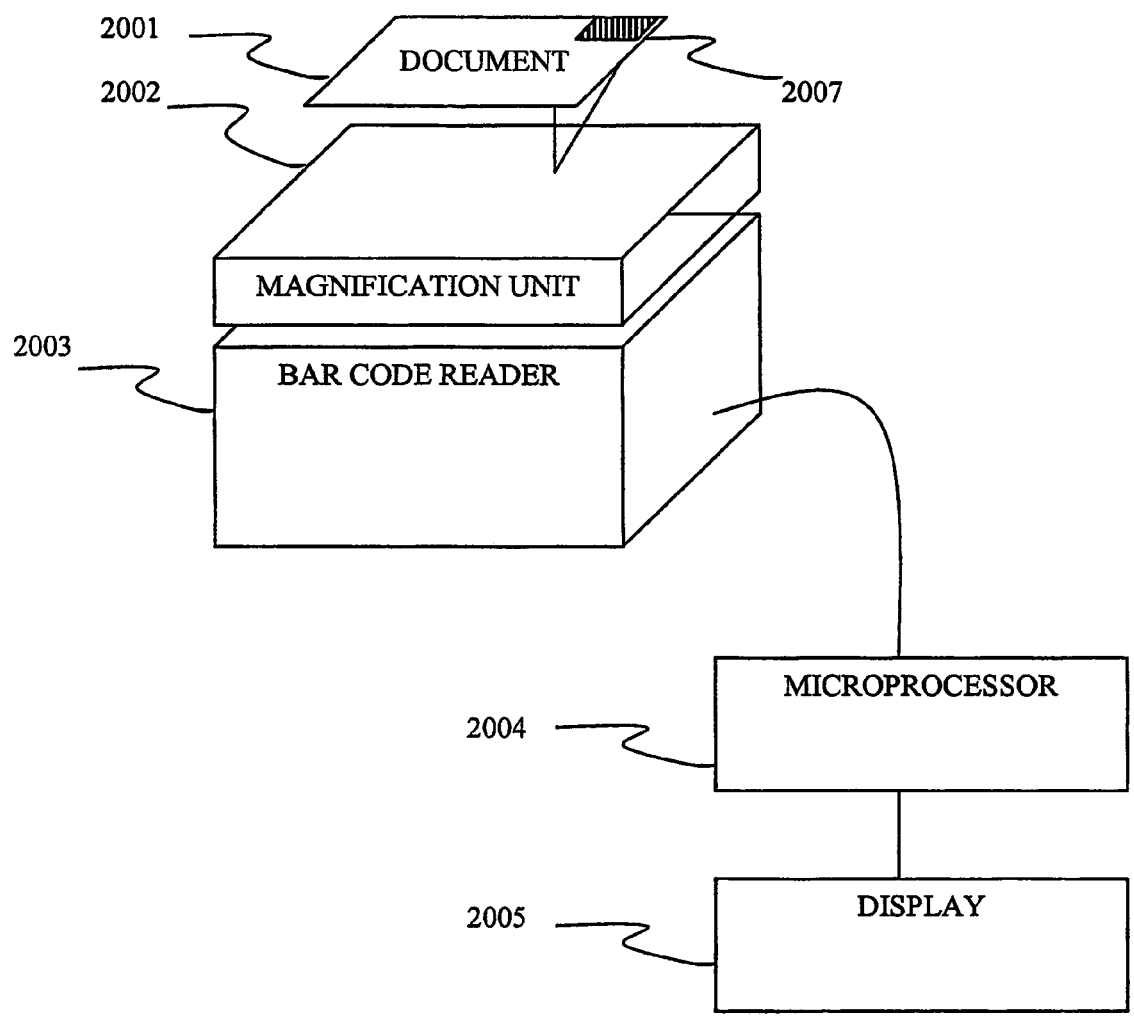
FIG. 12 illustrates an exemplary bar code reader capable of detecting a bar code as a latent image.

FIG. 12 illustrates an exemplary device for reading a bar code image formed on a document. As illustrated in FIG. 12, document 2001 preferably contains a bar code image 2007 which is hidden to the human eye. Magnifying unit 1002 preferably magnifies bar code image 2007 and provides the magnified image to bar code reader 2003. Bar code reader 2003 is preferably a conventional bar code reader capable of reading a plurality of substantially parallel lines and detecting at least one of the pitch, frequency and thickness of the plurality of the substantially parallel lines. Bar code reader 2003 provides the detected information to a microprocessor 2004, which uses the detected information to determine the content of recorded information in the bar code image 2007. The recorded information may preferably include information of the authenticity and identity of document 2007, such as the name of a person using an identification card as document 2001.

Microprocessor may authenticate document 2001 carrying bar code 2007 in the same manner as illustrated in FIG. 11, in which case bar code 2007, and the corresponding information recorded by bar code 2007, would preferably be one of the detected security images in step S2. For example, as an increased security measure, bar code 2007 may be used with other security images and with the layout of document 2007 to determine if document 2007 is an original or valid document. In this manner, a counterfeit document or a copied document in which bar code 2007 may have been successfully reproduced would result in the denial of access.

The architecture illustrated in each of FIGS. 10 and 12, may be entirely contained in a single device or multiple devices, and the functions associated with the architecture in FIGS. 10 and 12 may be performed by programmable software. Moreover, the operations illustrated in FIG. 11 may be performed by programmable software on an internal or external memory (not shown) associated with microprocessor 1004 or 2004, respectively, such as a ROM or a RAM or any other memory. The software that performs the operations illustrated in FIG. 11 may be embodied in the form of data in a computer readable medium. A computer readable medium within the scope of this disclosure includes any medium, physical or metaphysical, which is capable of carrying information in a form which can be read by an appropriately configured computer or mobile communication device and associated peripheral devices of the computer or station, including, but not limited to: an optical readable/writeable disc, a magnetic disk, a readable/writeable card, a magnetic tape, an electrical transmission signal for wireline or wireless transmission or optical transmission of data using electrical and/or electromagnetic signals. The data associated with the programmable software may be in the form of packetized digital data.

Figure 13:
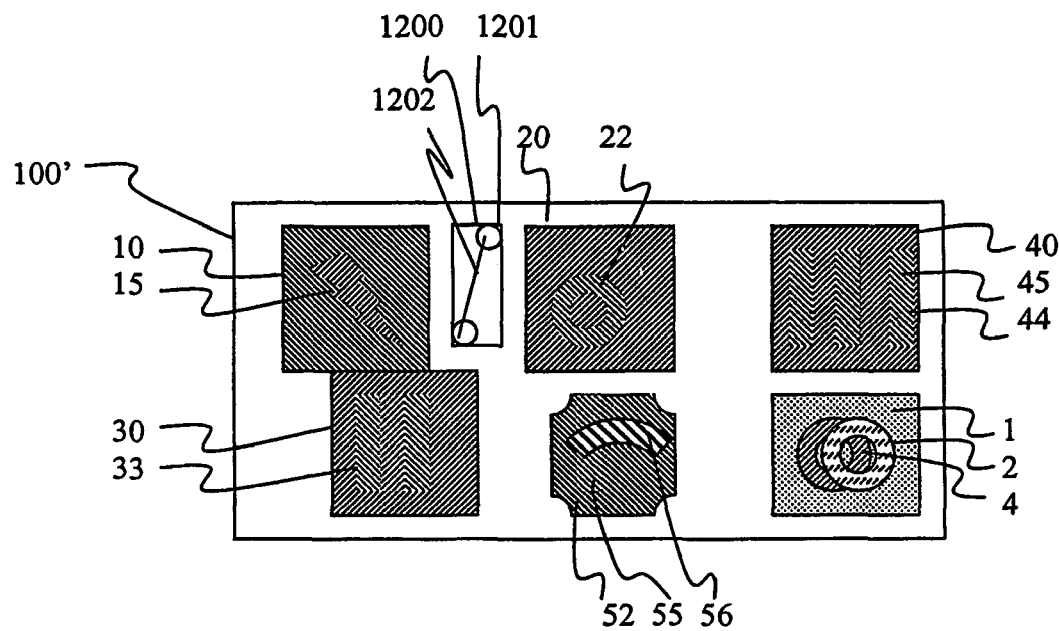
FIG. 13 illustrates a document which contains an exemplary conductive image.

FIG. 13 illustrates an exemplary conductive image 1200 on document 100, also containing a plurality of security images 1, 10, 20, 30, 40, and 52, which are discussed in connection with FIGS. 1-8. Exemplary conductive image 1200 preferably contains at least two contact areas 1201 which are connected by a conductive trace 1202. In a preferred construction, contact areas 1201 and conductive trace 1202 may be hidden or obscured from view by being elements of an image and/or being imbedded. The conductive image 1200 may be used to verify the validity of the document. Those of skill in the art will appreciate that contact areas 1201 and conductive trace 1202 may be made of any suitable conductive medium, such as metallic pads or strips, conductive ink, or suitable conductive materials.

Figure 14:
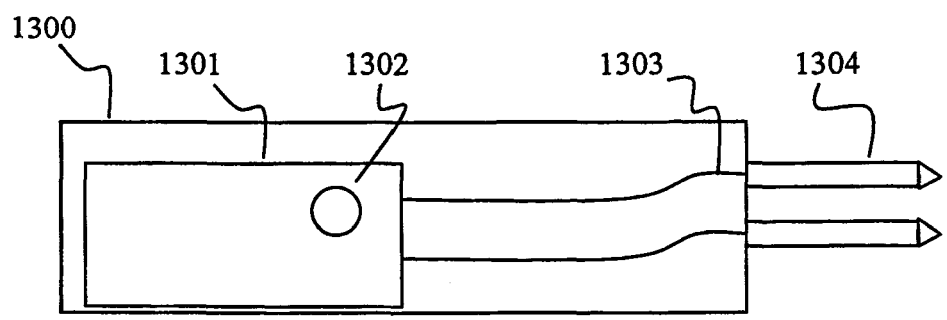
FIG. 14 illustrates a an exemplary verification device for verifying a document with a conductive image.

FIG. 14 illustrates an exemplary reading device 1300 which may be used to with conductive image 1200 to verify the document. The reading device may preferably be in the shape of a pen. Exemplary reading device 1300 preferably contains a controller 1301 which provides a voltage across wires 1303 to cause a current to flow through probes 1304 when they are applied to a valid document 100 having a conductive trace 1200. When probes are placed on contact areas 1201, one probe on each area, the current provided preferably flows through one of probes 1304, one of contact areas 1201, conductive trace 1202 to the other probe through the other contact area and back to controller 1301 through wire 1303, i.e. completing an electrical circuit. An indicator light 1302 is preferably provided which lights up when the current is passed through the conductive trace 1202 from one probe 1304 to the other, denoting a valid document. Those of skill in the art will appreciate that indicator light 1302 may consist of one or more single color LEDs, or LEDs of multiple colors, which light up when a sufficient amount of current or voltage is received. For example, when an activation switch (not shown) is pressed on reading device 1300, indicator light 1302 may light up green if the circuit has been completed (a valid document is detected), or may light up red, or not at all, if the circuit has not been completed (the document is not valid).

Those of skill in the art will also appreciate that indicator light 1302 may be replaced with an indicator display, such as a conventional voltmeter, which may display various attributes based on the received current, such as the amplitude of the current or voltage or the measured resistance of the conductive trace, and any of these values may be used to determine if a document is valid.

Figure 15:
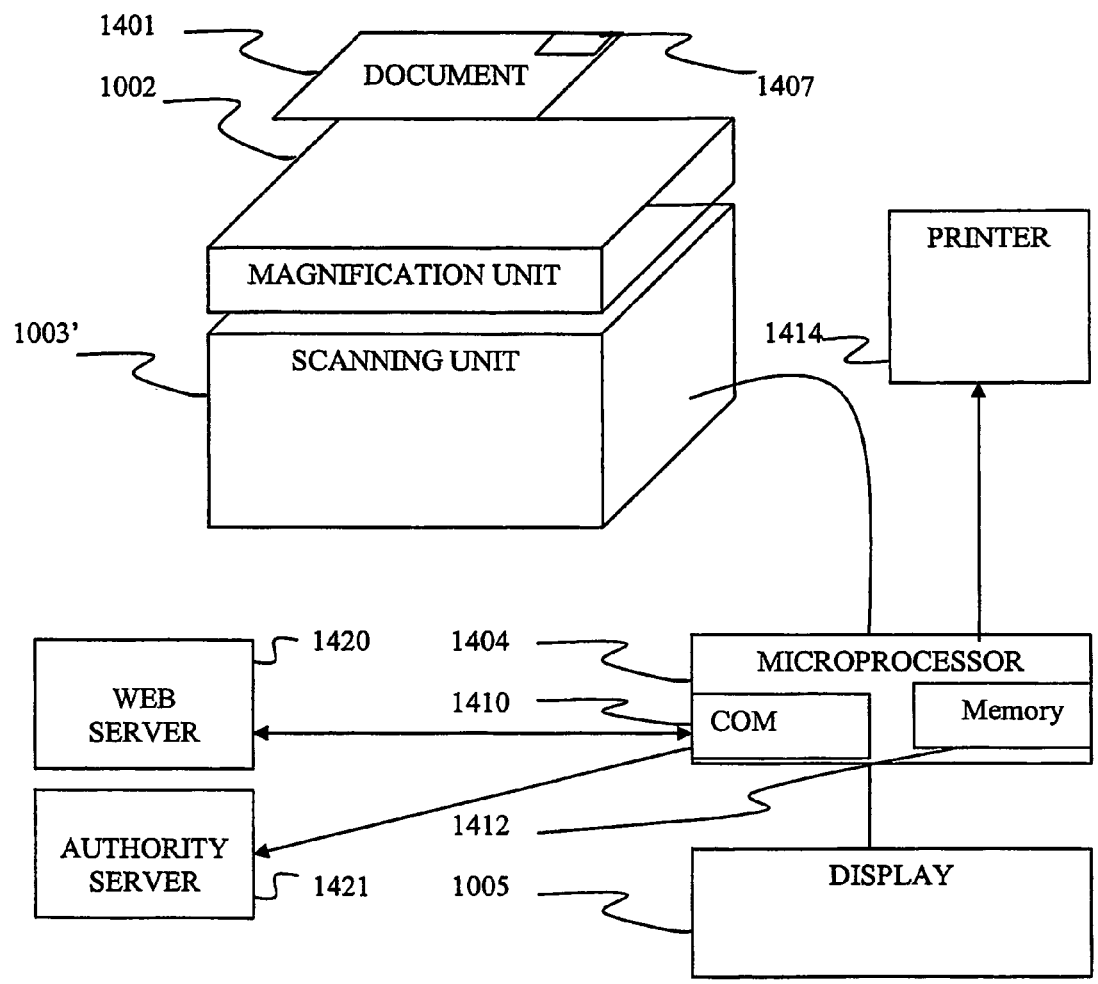
FIG. 15 illustrates an exemplary apparatus for detecting illegal publishing of documents.
Figure 16:
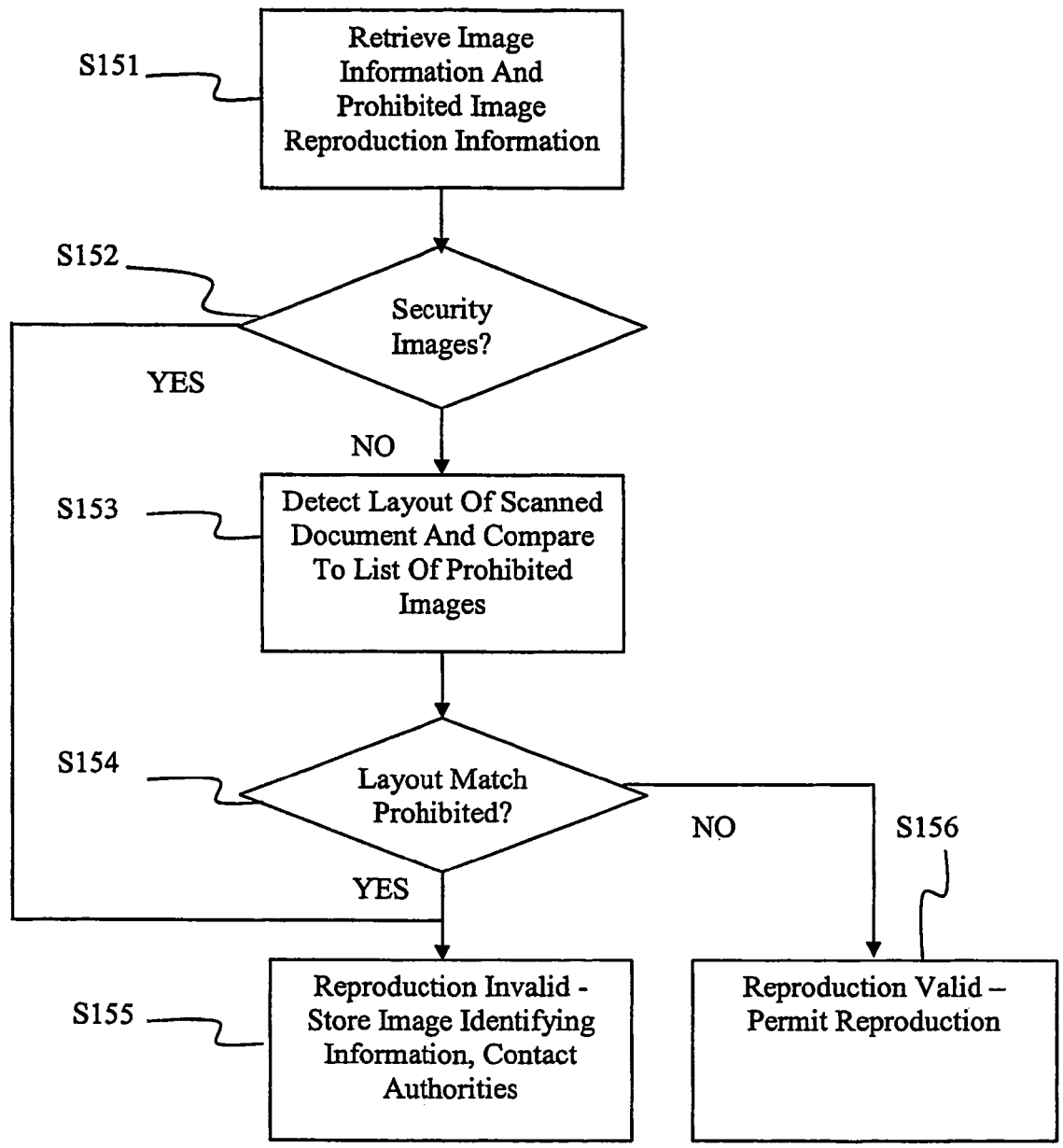
FIG. 16 illustrate an exemplary method for detecting illegal publishing of documents.

FIGS. 15 and 16 illustrate an exemplary embodiment for detecting and inhibiting illegal desk top publishing of documents. As illustrated in FIG. 15 a document 1401 being scanned by scanning unit 1403 may contain a security image 1407. Security image may preferably be an image made in accordance with the principles discussed in connection with FIGS. 1-8 of this application. Microprocessor 1404 preferably contains a list of prohibited images in memory 1412, such as U.S. currency (e.g. a U.S. $100 bill), and preferably stores a plurality of attributes of the prohibited images, such as at least one of a predetermined hidden or non-hidden security image, the layout of the prohibited image or selected portions of the prohibited image, hidden or non-hidden artwork or bar codes on the prohibited image, the line characteristics such as line density, line style (e.g. lines, dots, spots) line patterns, and line color of a predetermined part or all of the prohibited image.

Microprocessor may receive images through the Internet from a web based server 1420 or from any other internal or external source, such as a hard drive, a CD, DVD or floppy disk drives, a memory card/stick or wireline and/or wireless communications, as illustrated in step S151 in FIG. 16. A received image is evaluated to determine if it contains a predetermined security image which designates the image a prohibited image, as illustrated in step S152. If the image does not contain a predetermined security image, NO in step S152, then the document is evaluated by detecting for the presence of one or more predetermined attributes which are preferably uniquely associated with a prohibited document as discussed above, as illustrated in step S153. If the image is not determined to be a prohibited image to reproduce, microprocessor 1404 provides instruction to printer 1414 to print the image.

When a prohibited image is detected, YES in steps S152 and S154, microprocessor 1404 preferably inhibits printer 1414 from reproducing the document and stores illegal activity documentation information documenting the attempted illegal activity into a log on memory 1412. The illegal activity documentation is preferably held in memory 1412 so that law enforcement authorities may open up the database and review the illegal activity. The stored illegal activity documentation information may include an identification of the document attempted to be reproduced, such as an image of the document, identification of the source of the image of the document (e.g. from a web server, scanner, etc.), user identification such as the computer identification and user address, and date and time of attempted illegal activity. The illegal activity documentation may also include the path of the illegal document from emails and the Internet, such as web addresses, and the length of time the user spent on particular websites, the screen name and what servers the document came from. Servers that host the websites would preferably contain a similarly programmed microprocessor, such as having the same program or as having a specially designated guard chip. If the user is logged on the internet, microprocessor 1404 may also initiate a silent communication with law enforcement authorities by using communication software or device 1410 to connect to the authority's server 1421 without the user's knowledge or initiation and send the illegal activity documentation information. If the user is not logged onto the Internet, microprocessor 1404 will preferably cause the communication to be sent upon the next or later logon operations. Microprocessor 1404 may also cause a computer in which it resides (not shown) to be shut down, and/or to also shut down an email system if the document was received from another computer when an illegal operation is detected.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A document carrying a latent image comprising:
a background area formed at a first color;
a first latent image portion printed with a line frequency at a first angle and a second color;
a second latent image portion printed with a line frequency, at the first angle and a third color;
the first latent image portion and the second latent image portion overlapping within a common area that is separate from the background area which at least partially surrounds the common area;
the common area of the first latent image portion and the second latent image portion appearing as substantially the same color as the first color so that the latent image is obscured to the eye; and
the first latent image portion including printed lines, dots or spots, and the second latent image portion includes printed lines, dots or spots placed between adjacent printed lines, dots or spots of the first image portion.

2. The document of claim 1, wherein the first and second latent image portions are printed with the same line frequency so that when the document is reproduced by a copying or scanning device, a solid tonal color is reproduced within the common area of the first and second latent image portions in substantially the same color as the first color, thereby not reproducing the first and second latent image portions as a visible image in a copy of the document.

3. The document of claim 1, wherein the line frequency of the second latent image portion is lower than the line frequency of the first image portion so that when the document is reproduced by a copying or scanning device, a composite image of the first latent image portion and the second latent image portion is formed as a visible image in a copy of the document.

4. The document of claim 3, wherein a copy of the document contains distortions.

5. The document of claim 3 in which the line frequency of the first latent image portion is greater than 175 lines per inch.

6. The document of claim 5 in which the line frequency of the second latent image portion is between 50 and 135 lines per inch.

7. The document of claim 1, wherein the first image portion is a holographic image.

8. The document of claim 1, wherein the first image portion is art work.

9. The document of claim 8, wherein the first latent image portion and the second latent image portions are formed after the creation of the art work.

10. The document of claim 1, wherein the first image portion is a photograph.

11. The document of claim 10, wherein the first latent image portion and the second latent image portions are formed after the creation of the photograph.

12. A method of authenticating the document of claim 1 as an original document comprising the steps of:

reviewing the document for the presence of predetermined security images which are not reproduced when a reproduction of the document is made by a copying or scanning device; and determining the document not to be an original if the predetermined security images are not present in the document.

13. The method of claim 12, further comprising the steps of comparing a layout of the document to a layout of the original document, and determining the document to be an original document if the layout of the document corresponds to the layout of an original document.

14. The method of claim 13, further comprising the step of displaying a message indicative of whether the document has been determined to be an original document.

* * * * *